US009786297B2

(12) United States Patent
Fine (10) Patent No.: US 9,786,297 B2
(45) Date of Patent: Oct. 10, 2017

(54) IDENTIFICATION BY SOUND DATA (71) Applicant: EMPIRE TECHNOLOGY DEVELOPMENT LLC, Wilmington, DE (US)

(72) Inventor: Kevin S. Fine, Yverdon-les-Bains (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 108 days.

(21) Appl. No.: 14/420,858

(22) PCT Filed: Apr. 9, 2014

(86) PCT No.: PCT/US2014/033525
§ 371 (c)(1),
(2) Date: Feb. 10, 2015

(87) PCT Pub. No.: WO2015/156798
PCT Pub. Date: Oct. 15, 2015

(65) Prior Publication Data
US 2016/0254009 A1  Sep. 1, 2016

(51) Int. Cl.
*G10L 25/54* (2013.01)
*G10L 17/22* (2013.01)
(Continued)

(52) U.S. Cl.
CPC ........ *G10L 25/54* (2013.01); *G06F 17/30766* (2013.01); *G10L 15/30* (2013.01);
(Continued)

(58) Field of Classification Search
CPC ........ G10L 17/02; G10L 17/005; G10L 17/00
See application file for complete search history.

(56) References Cited

U.S. PATENT DOCUMENTS 8,989,773 B2 * 3/2015 Sandel ................... H04W 4/028
455/456.1
2007/0071206 A1 * 3/2007 Gainsboro .......... H04M 3/2281
379/168
(Continued)

OTHER PUBLICATIONS

"Scaling Up Machine Learning, with Ron Bekkerman," LinkedIn Tech Talks, Retrieved from URL: http://www.youtube.com/watch?v=pyac2Xm38qQ, on Dec. 4, 2014, pp. 1-2.
(Continued)

*Primary Examiner* — Matthew Baker
(74) *Attorney, Agent, or Firm* — Moritt Hock & Hamroff LLP; Steven S. Rubin, Esq.

(57) ABSTRACT

Technologies are generally described for systems, devices and methods effective to identify an individual. In some examples, a microphone may receive sound data such as sound that may be present in a mall. A processor, that may be in communication with the microphone, may determine a name from the sound data. Stated differently, the processor may determine that the name is part of or included in the sound data. The processor may generate a query based on the name and may send the query to a social network database. The processor may receive a response to the query from the social network database and may identify the individual based on the response.

19 Claims, 6 Drawing Sheets

(51) Int. Cl.
 G10L 15/30 (2013.01)
 G10L 17/14 (2013.01)
 G06Q 30/02 (2012.01)
 G06Q 50/00 (2012.01)
 G06F 17/30 (2006.01)
(52) U.S. Cl.
 CPC .............. *G10L 17/14* (2013.01); *G10L 17/22* (2013.01); *G06Q 30/0251* (2013.01); *G06Q 50/01* (2013.01)

(56) References Cited

U.S. PATENT DOCUMENTS

| 2007/0116227 | A1 | 5/2007 | Vitenson et al. | |
|---|---|---|---|---|
| 2009/0086720 | A1 | 4/2009 | Westlake | |
| 2011/0288866 | A1 | 11/2011 | Rasmussen | |
| 2012/0050033 | A1* | 3/2012 | Westen | G01S 5/0027 340/539.13 |
| 2012/0065969 | A1 | 3/2012 | DeLuca et al. | |
| 2012/0123779 | A1* | 5/2012 | Pratt | G10L 15/26 704/235 |
| 2012/0158501 | A1* | 6/2012 | Zhang | G06Q 30/0255 705/14.53 |
| 2012/0253811 | A1 | 10/2012 | Breslin et al. | |
| 2013/0132194 | A1* | 5/2013 | Rajaram | G06Q 50/01 705/14.52 |
| 2014/0162698 | A1* | 6/2014 | Han | H04W 4/00 455/456.3 |
| 2014/0330566 | A1* | 11/2014 | Redfern | G10L 17/005 704/246 |
| 2015/0139508 | A1* | 5/2015 | Ye | G06K 9/00892 382/116 |

OTHER PUBLICATIONS

"Speaker diarisation," Retrieved from URL: https://web.archive.org/web/20120908123508/http://en.wikipedia.org/wiki/Speaker_diarisation, on Dec. 4, 2014, last modified on Jul. 23, 2012, pp. 1-3.
"Speaker Independent Connected Speech Recognition—Fifth Generation Computer Corporation," Retrieved from URL: https://web.archive.org/web/20131111101228/http://www.fifthgen.com/speaker-independent-connected-s-r.htm, on Dec. 4, 2014, pp. 1-14.
"Zipf's law," Retrieved from URL: https://web.archive.org/web/20140122103908/http://en.wikipedia.org/wiki/Zipf%27s_law, on Dec. 4, 2014, last modified on Jan. 20, 2014, pp. 1-7.
Al-Rfou, R., and Skiena, S., "SpeedRead: A Fast Named Entity Recognition Pipeline," Proceedings of COLING Technical Papers, pp. 51-66 (Dec. 2012).
Anguera, M. X., et al. "Speaker Diarization: A review of recent research," Audio, Speech, and Language Processing, IEEE Transactions on Audio, Speech, and Language Processing, vol. 20, Issue 2, pp. 356-370 (Feb. 2012).
Backstrom, L., "Anatomy of Facebook," Retrieved from URL: https://www.facebook.com/notes/facebook-data-team/anatomy-of-facebook/10150388519243859, on Dec. 4, 2014, posted on Nov. 21, 2011, pp. 1-5.
Baker, J. M., et al. "Research Developments and Directions in Speech Recognition and Understanding, Part 1[DSP Education]," IEEE Signal Processing Magazine, vol. 26, Issue 3, pp. 75-80 (May 2009).
Chong, J., et al., "Scalable Parallelization of Automatic Speech Recognition," In Scaling up machine learning: Parallel and distributed Approaches, Chapter 21, Cambridge University Press, Eds. Bekkerman, R., et al., pp. 446-470 (Dec. 2011).
Grabianowski, E., "How Speech Recognition Works," Retrieved from URL: https://web.archive.org/web/20131224094951/http://electronics.howstuffworks.com/gadgets/high-tech-gadgets/speech-recognition2.htm, on Dec. 4, 2014, pp. 1-2.
Jousse, V., et al., "Automatic named identification of speakers using diarization and ASR systems," ICASSP '09 IEEE International Conference on Acoustics, Speech and Signal Processing, pp. 4557-4560 (Apr. 19-20, 2009).
Salamin, H., and Vinciarelli, A., et al., "Automatic Role Recognition in Multiparty Conversations: An Approach Based on Turn Organization, Prosody, and Conditional Random Fields," IEEE Transactions on Multimedia, vol. 14, No. 2, pp. 338-345 (Apr. 2012).
Serrano, J. L., "Speaker Diarization and Tracking in Multiple-Sensor Environments," Ph.D Dissertation, pp. 1-323 (Oct. 2012).
Stein, S., "Could the future of Glass and wearables be hidden in Moto X?," Retrieved from URL: http://www.cnet.com/news/could-the-future-of-glass-and-wearables-be-hidden-in-moto-x/, on Dec. 4, 2014, posted on Aug. 2, 2013, pp. 1-10.
Togneri, R., and Pullella, D., "An overview of speaker identification: Accuracy and robustness issues," IEEE Circuits and Systems Magazine, 2011, pp. 23-61, vol. 11, Issue 2.
Zhu, J., et al., "Adaptive Named Entity Recognition for Social Network Analysis and Domain Ontology Maintenance," Tech Report kmi-04-30, Dec. 2005, pp. 1-18.
International Search Report & Written Opinion for PCT application with application No. PCT/US2014/033525, dated Nov. 20, 2014, 12 pages.
Favre, Sarah, "Social Network Analysis for Automatic Role Recognition", Thèse École polytechnique fédérale de Lausanne EPFL, No. 4931 (2011), 102 pages.

* cited by examiner

Fig. 5

IDENTIFICATION BY SOUND DATA

CROSS REFERENCE TO RELATED APPLICATION

This application is the U.S. National Stage filing under 35 U.S.C. §371 of International Application Ser. No. PCT/US14/33525 filed on Apr. 9, 2014. The disclosure of the International Application is hereby incorporated herein by reference in its entirety.

BACKGROUND

Unless otherwise indicated herein, the materials described in this section are not prior art to the claims in this application and are not admitted to be prior art by inclusion in this section.

Behaviors and activities may be monitored for the purpose of influencing and aiding groups or individuals. Monitoring may be performed by various methods. Some monitoring may include human observation and postal interception. Other monitoring may include observation from a distance by means of electronic devices such as cameras, or interception of electronically transmitted information such as internet traffic and phone calls.

SUMMARY

In an example, methods effective to identify an individual are generally described. The methods may include receiving sound data at a microphone. A processor may be configured to be in communication with the microphone. The methods may include the processor determining a name from the sound data. The methods may also include the processor generating a query based on the name. The methods may include the processor sending the query to a social network database. The methods may also include the processor receiving a response to the query from the social network database. The methods may include the processor identifying the individual based on the response.

In an example, methods effective to identify a group that includes at least a first and a second individual are generally described. The methods may include a processor generating first sound data at a first microphone at a first location. The first sound data may relate to a first voice and a second voice. The methods may include the processor identifying first voice data in the first sound data. The methods may include the processor identifying second voice data in the first sound data. The methods may include the processor generating second sound data at a second microphone at a second location. The second sound data may relate to the first voice and the second voice. The methods may include the processor identifying third voice data in the second sound data. The methods may include the processor identifying fourth voice data in the second sound data. The methods may include the processor grouping the first, second, third and fourth voice data into a group. The methods may include the processor determining a first name from the first sound data. The methods may include the processor determining a second name from the second sound data. The methods may include the processor generating a query based on the first and second name. The methods may include the processor sending the query to a social network database. The methods may include the processor receiving a response to the query from the social network database. The methods may include the processor identifying that the first individual is in the group based on the response. The methods may include the processor identifying that the second individual is in the group based on the response.

In an example, systems configured to identify an individual are generally described. The systems may include a microphone and a processor. The microphone may be configured to generate sound data. The processor may be configured to be in communication with the microphone, a memory, and a social network database. The processor may be further configured to receive the sound data from the microphone. The processor may be configured to determine a name related to the individual from the sound data. The processor may be configured to generate a query based on the name. The processor may be configured to send the query to a social network database. The processor may be configured to receive a response to the query from the social network database. The processor may be configured to identify the individual based on the response.

In an example, systems effective to identify a group that includes at least a first and a second individual are generally described. The systems may include a first microphone, a second microphone and a processor. The first microphone may be at a first location. The first microphone may be configured to generate first sound data. The second microphone may be at a second location. The second microphone may be configured to generate second sound data. The processor may be configured to be in communication with the first microphone, the second microphone, a memory, and a social network database. The processor may be configured to receive the first sound data from the first microphone. The processor may be configured to identify first voice data in the first sound data. The processor may be configured to identify second voice data in the first sound data. The processor may be configured to receive the second sound data from the second microphone. The processor may be configured to identify third voice data in the second source data. The processor may be configured to identify fourth voice data in the second source data. The processor may be configured to group the first, second, third and fourth voice data into a group. The processor may be configured to determine a first name from the first sound data. The processor may be configured to determine a second name from the second sound data. The processor may be configured to generate a query based on the first and second name. The processor may be configured to send the query to a social network database. The processor may be configured to receive a response to the query from the social network database. The processor may be configured to identify that the first individual is in the group based on the response. The processor may be configured to identify that the second individual is in the group based on the response.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to identification by sound data.

Briefly stated, technologies are generally described for systems, devices and methods effective to identify an individual. In some examples, a microphone may receive sound data such as sound that may be present in a mall. A processor that may be in communication with the microphone, may determine a name from the sound data. Stated differently, the processor may determine that the name is part of or included in the sound data. The processor may generate a query based on the name and may send the query to a social network database. The processor may receive a response to the query from the social network database and may identify the individual based on the response.

As described in more detail below, in an example, an identification of a group, or an individual within a group, may be determined with use of sound data. Microphones may monitor sound, such as voices, that is generated or produced in an area. Individuals may be determined from the voices included in the sound detected in the area. Movement of the individuals may be tracked within the area by analyzing sound received by microphones at different locations within the area. Groups of individuals may be determined by tracking individuals that move together. Words spoken within a group may be recognized and analyzed to determine names of the individuals in the group. The names of the individuals may be used as queries to a social network database to identify individuals.

Figure 1:
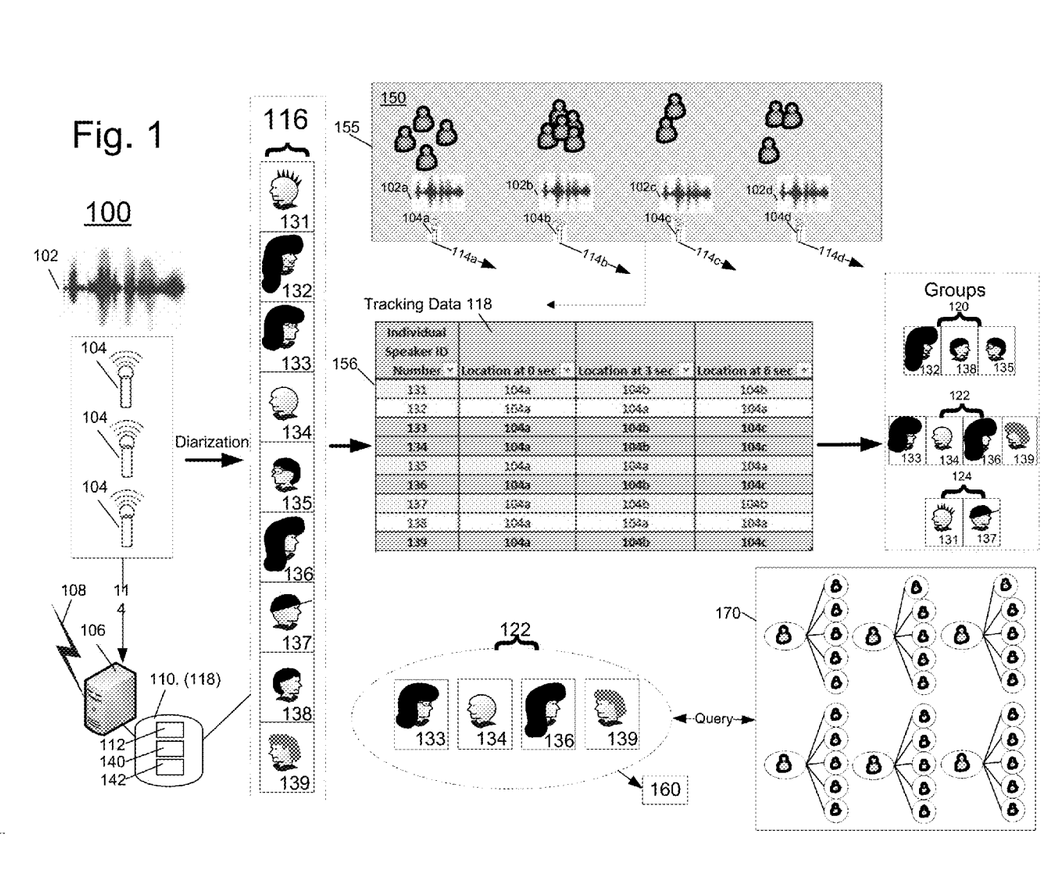
FIG. 1 illustrates an example system effective to implement identification by sound data.

FIG. 1 illustrates an example system 100 effective to implement identification by sound data, arranged in accordance with at least some embodiments described herein. In some examples, system 100 may include one or more microphones 104, a processor 106, and a memory 110. Microphone 104 may be a microphone in a mobile device such as a cell phone, or tablet device. Microphone 104 may include more than one microphone unit such as multiple microphones arranged in an array. Processor 106 may be in communication with microphones 104 over network 108. Processor 106 may also be in communication with memory 110. Memory 110 may include identity instructions 112, diarization instructions 140 and speech recognition instructions 142. Processor 106 may also be in communication with a social network 170 over network 108. As discussed in more detail below, processor 106 may determine an identification of a group or individual within a group by analyzing sound data.

In one example, microphones 104 may detect and receive sound 102. Sound 102 received by microphones 104 may be waves perceptible to humans such as waves of the frequencies from about 20 Hz to about 20,000 Hz. Microphones 104 may generate sound data 114 in response to sound 102. Sound 102 may be related to voices, or individuals speaking, within a zone 150 that may be in a sound range of microphones 104. Processor 106 may receive sound data 114 from microphones 104 over network 108. Processor 106, by executing diarization instructions 140, may analyze sound data 114 to determine a number of voices present in sound data 102 and to determine voice data in sound data 114 related to each individual voice within sound 102. Processor 106 may execute speaker diarization on sound data 114 to separate sound data 114 into voice data related to each individual voice in sound 102. For example, processor 106, executing diarization instructions 140 on sound data 114, may determine there are four voices present in sound 102. Processor 106 executing diarization instructions 140 may segregate sound data 114 into voice data associated with each of the four voices determined to be present in sound 102. Processor 106 may relate each determined voice and the segregated voice data to an individual to generate set of individuals 116. Processor 106 may assign an identification number to each individual in set of individuals 116. Set of individuals 116 are represented in FIG. 1 by profiles with identification numbers 131, 132, 133, 134, 135, 136, 137, 138, and 139. For example, if processor 106 determined nine voices were present in sound 102, processor may segregate sound data 114 into voice data related to each of the nine determined voices in sound data 102. Processor 106 may assign identification number 131 to an individual associated with voice data related to the first voice, assign identification number 132 to an individual associated with voice data related to the second voice, assign identification number 133 to an individual associated with voice data related to the third voice, and so on, until an identification number is assigned to each of the nine determined voices in sound 102.

Processor 106 may assign or identify a location corresponding to each microphone 104 such that sound 102 monitored by each microphone 104 may be related to the corresponding location of the respective microphone. For example, as shown at 155, four microphones 104 (shown as 104a, 104b, 104c, 104d) at four locations may be within zone 150 with corresponding monitored sounds 102 (including 102a, 102b, 102c, and 102d) and sound data 114 (including 114a, 114b, 114c, and 114d).

Processor 106 may determine tracking data 118 by analyzing sound data 114. Processor 106 may determine a location for each individual, in set of individuals 116, based on locations of microphones 104 and sound data 114 received by microphones 104 at each location. Processor 106 may track each individual represented by identification numbers 131-139, as each individual moves around within zone 150 and determine tracking data 118. Processor 106, having assigned an identification number to each individual in set of individuals 116, may store a record of tracking data 118 for each individual in memory 110. Each identification number in set of individuals 116 may relate to voice data in sound data 114. Tracking data 118 may be associated with voice data related to each identification number and the respective microphone 104 (104*a*, 104*b*, 104*c*, 104*d*) from which processor 106 receives sound data 114. Tracking data 118 may be stored periodically in memory 110 and may include data related to a location of an individual at successive times. Tracking data 118 may be stored at successive time intervals of about 0.5 seconds to about 10 seconds for any time period.

Processor 106 may group voice data of individuals into groups 120, 122, 124 who may be travelling together. Processor 106 may determine groups 120, 122, 124 by tracking individuals and analyzing tracking data 118 to determine individuals that move together in a group within zone 150 of microphones 104.

In an example, as depicted at 156, individuals with identification numbers 131-139 may all be detected as speaking at a first time (0 sec) and location corresponding to microphone 104*a*. Identification numbers 131, 133, 134, 136, 137, and 139 may be detected as speaking at a second location corresponding to microphone 104*b* at a successive time (3 sec). Tracking data for identification numbers 133, 134, 136, and 139 may be detected to be speaking at a third location corresponding to microphone 104*c* at a further successive time (6 sec). Processor 106 may determine identification numbers 133, 134, 136, and 139 have the same tracking data. Processor 106 may group identification numbers 133, 134, 136, and 139 and corresponding voice data into group 122 due to tracking data 118 for each identification number 133, 134, 136, and 139 including the same location and changes in location for three subsequent times. In another example, a group may be determined with only one individual when the individual is monitored while speaking on a phone. In one example, all individuals in set of individuals 116 may be determined as groups of one if no tracking data 118 is determined.

Upon grouping voice data associated with individuals and tracking data 118, processor 106 may analyze sound data 114 related to the group. Sound data 114 related to the group may include sound data 114 related to each individual determined to be in the group. In an example, processor 106 may determine individuals (e.g., identification numbers profiles 133, 134, 136, 139) form group 122. Processor 106 may analyze sound data 114 related to group 122 and identification numbers 133, 134, 136, and 139. Processor 106 may exclude sound data related to individuals not in group 122 such as identification numbers 131, 132, 135, 137, and 138 in groups 120, 124. Processor 106 may execute speech recognition instructions 142 on sound data 114 related to group 122 to identify names within sound data 114. In an example, speech recognition instructions 142 may convert sound data 114 related to group 122 into text, separate the text into words, and separate names from the words.

Identified names from sound data 114 may include first names of individuals within group 122. Identified names from sound data 114 related to group 122 may also include names of people not present in the group, for example, famous people such as politicians, actors, sports stars etc. Processor 106 may filter identified names to remove names of famous people and produce a set of filtered identified names 160. Filtering may be accomplished by comparing identified names in sound data 114 to a list of names where the list may include famous names.

Speech recognition instructions 142 may include natural language processing (NPL) algorithms which may use grammar rules to extract meaning from words in sound data 114. In an example, if sound data 114 relates to the words "Riley did you" spoken by an individual corresponding to identification number 133 of group 122, then processor 106 may determine that one of identification numbers 134, 136, or 139 may correspond to an individual named Riley.

In some examples, processor 106 may identify a name of an individual by identifying names spoken by individuals in sound data 114. For example, sound data 114 may relate to names spoken by identification number 133 in group 122 and include "Tom", "Mike", and "Riley". Set of filtered identified names 160 may include "Tom", Mike", "Riley" and "Sally". Processor 106 may identify identification number 133 as "Sally" based on sound data 144 of identification number 133 including all names in set of filtered identified names 160 except one—"Sally."

In some examples, processor 106 may not determine a specific name for each individual within group 122 due to insufficient sound data 114. Processor 106 may identify set of filtered identified names 160 related to all the individuals in group 122 rather than identify a specific name for each identification number 133, 134, 136, and 139. For example, processor 106 may determine that set of filtered identified names 160 may include "Tom", Mike", "Riley" and "Sally". Sound data 114 may not include enough other information so that one name in set of filtered identified names 160 may be determined for one identification number in group 122. As described in more detail below, upon determining set of filtered identified names 160 related to individuals in group 122, processor 106 may send a query to a social network database 170 with set of filtered identified names 160 to identify one or more individuals in group 122.

Figure 2:
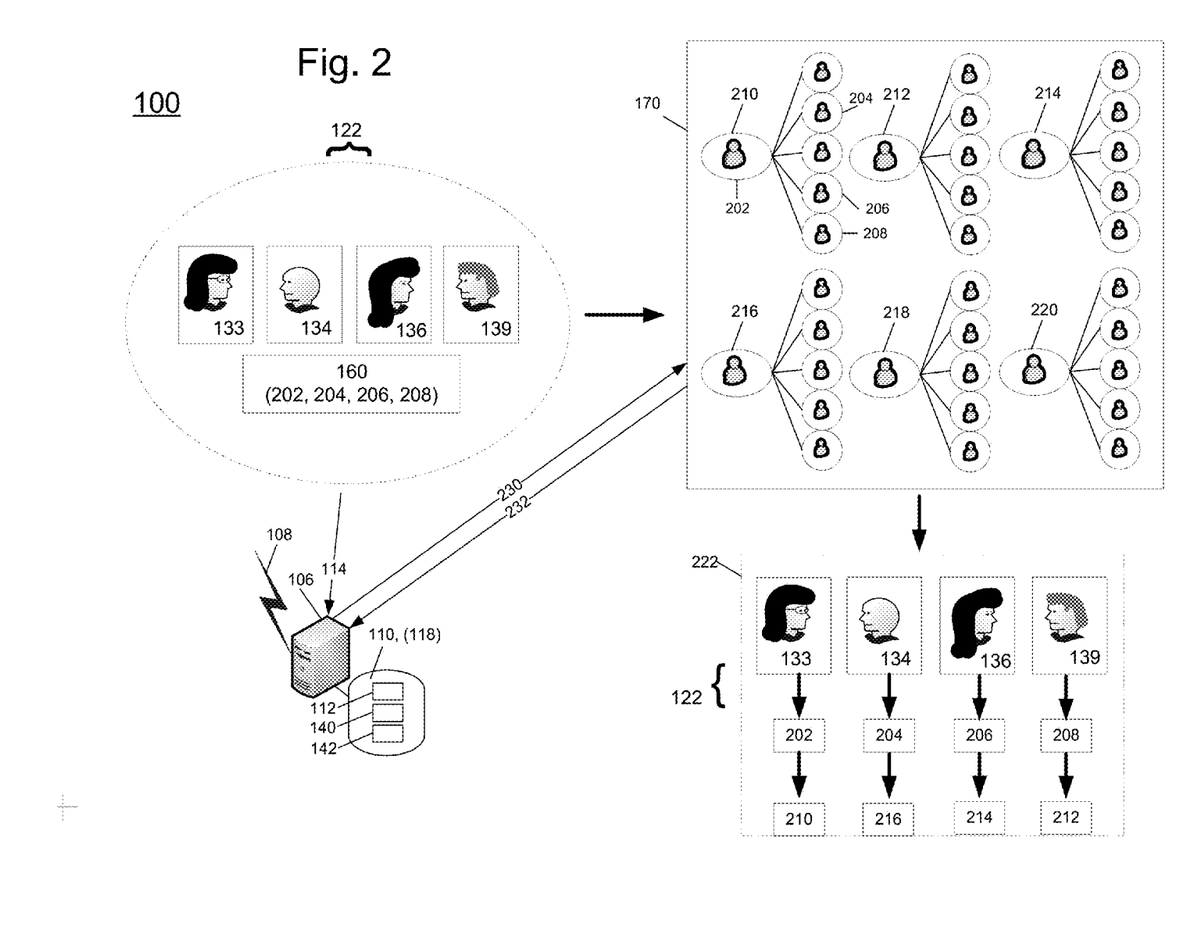
FIG. 2 illustrates the example system of FIG. 1 with additional details relating to identifying individuals within a group using a query sent to a social network database.

FIG. 2 illustrates example system 100 of FIG. 1 with additional details relating to identifying individuals within a group using a query sent to a social network database, arranged in accordance with at least some embodiments described herein. FIG. 2 is substantially similar to FIG. 1, with additional details. Those components in FIG. 2 that are labeled identically to components of FIG. 1 will not be described again for the purposes of clarity.

After processor 106 determines set of filtered identified names 160 related to individuals 116 in group 122, processor 106 may generate and send a query 230 to social network database 170. For example, processor 106 may use an application programming interface (API) of social network database 170 to generate query 230. Social network database 170 may be a database related to any social or professional network such as FACEBOOK, LINKED-IN, etc. Social network database 170 may include social network data related to names of social network members. Processor 106 may also base query 230 sent to social network database 170 on a location of group 122 or microphones 104. For example, processor 106 may be analyzing sound data 114 generated by a microphone 104 located in a mall in Pennsylvania. Processor 106 may send query 230 to social network database 170 for names of members of social network database 170 that reside within Pennsylvania, or for members in a radius of 0-50 miles from the mall in Pennsylvania. In response to query 230 from processor 106, set of filtered identified names 160 may be compared to names in social network database 170 such as by processor 106 or by a processor associated with social network database 170. The comparison may be made on a first name basis. For example, if set of identified filtered names 160 includes names 202, 204, 206, and 208, processor 106 may analyze social network database 170 for members and connected members who are connected to members with the first names 202, 204, 206, and 208.

In another example, set of filtered identified names 160 may include names 202, 204, 206, and 208 related to identification numbers 133, 134, 136, and 139 respectively.

Processor 106 may send query 230 to social network database 170 to compare names 202, 204, 206, and 208 to social network database 170. Query 230 may include names 202, 204, 206, 208. Processor 106 may receive a response 232 to query 230. Response 232 may indicate that data related to a social network member 210 includes and is connected to names 202, 204, 206, and 208. Processor 106 may then determine that social network member 210 is in group 122 because, in part, sound data 114 included names 202, 204, 206, 208 and social network member 210 includes and is connected to names 202, 204, 206, 208 in his/her social network. For example, social network member 210 may be "Sally Smith", name 202 may be "Sally" and Sally the individual may be identified as corresponding to identification number 133.

Response 232 from social network database 170 may depend on the size of social network database 170, the number of names in query 230, and any other query information which may refine query 230, such as location detail. A larger social network database 170 may require more names to determine one single social network member with names in set of filtered identified names 160 in his/her social network. The required amount of names to identify an individual may vary depending on the size of group 122, the size of social network database 170 and the popularity of the names. For example, more popular names may be associated with more social network members. An individual may be identified for social network database 170 with as little as one filtered identified name.

Response 232 may identify social network members corresponding to each name 202, 204, 206, and 208. For example, as depicted at 222, response 232 may identify social network member 210 as name 202, social network member 216 as name 204, social network member 214 as name 206 and social network member 212 as name 208. As discussed above, processor 106 may identify members of group 122 as including social network members 210, 216, 214 and 212. Social network database 170 may include a first and last name for each social network member 210, 216, 214, and 212. Processor 106 may analyze social network database 170 related to social network members 210, 216, 214, and 212 for marketing or advertising purposes. Processor 106 may then send advertising content to a device associated with any of social network members 210, 216, 214, and 212 in group 122.

Response 232 may include other information related to social network members 210, 216, 214, and 212. For example, processor 106 may determine that social network members 210, 216, 214, and 212 all played together on a high school football team. In the example, processor 106 may send an advertisement for a football fantasy league to a device associated with social network members 210, 216, 214, and 212 in response.

Memory 110 may include a database of specific advertising content. Processor 106 may analyze social network member information for specific social network member criteria dependent on the specific advertising content. For example, ladies business clothing may be best advertised to social network members identified as working women. Memory 110 may also have advertising content which is not dependent on specific social network member criteria, for example, a lunch special at a local restaurant may appeal to anyone wanting lunch.

Figure 3:
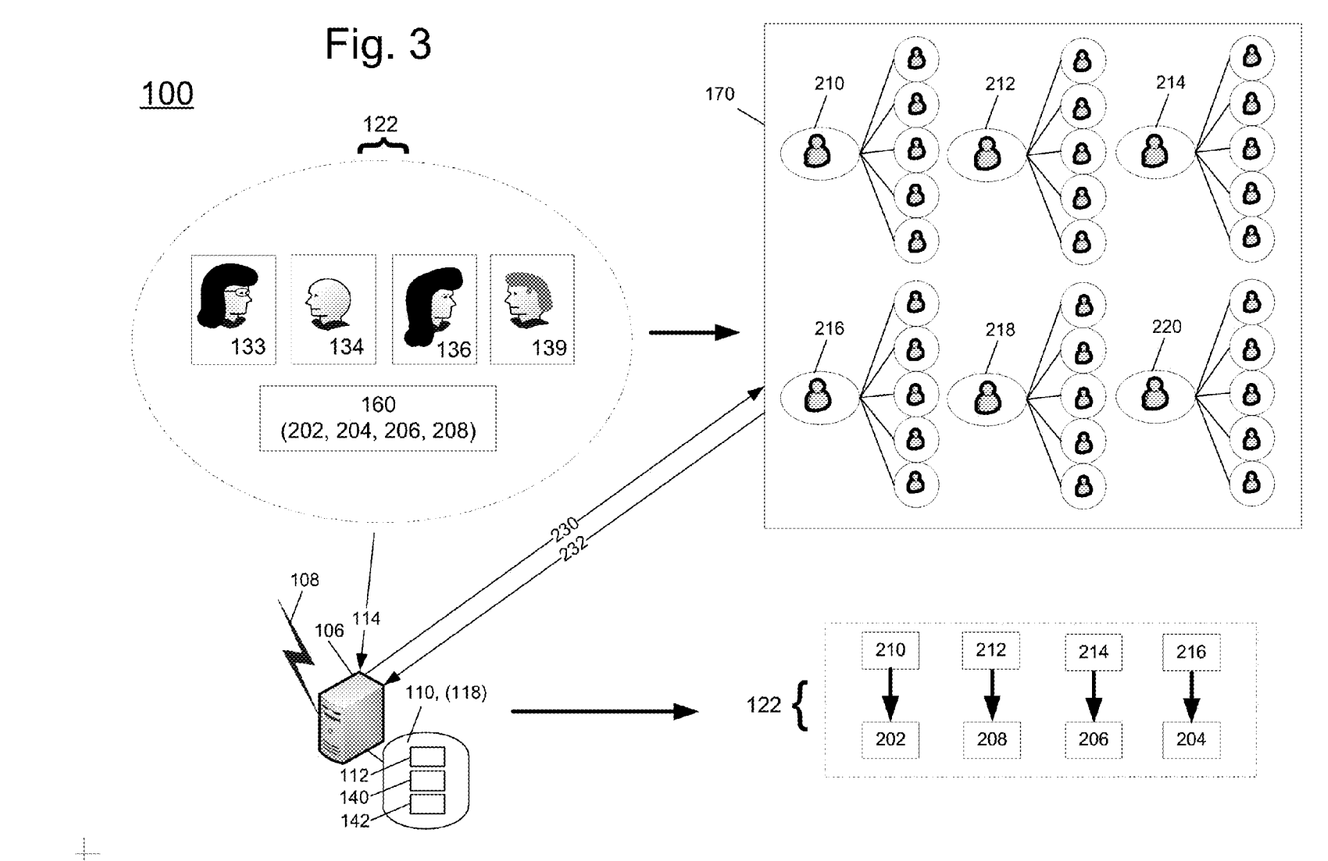
FIG. 3 illustrates the example system of FIG. 1 and FIG. 2 with additional details relating to identifying a group.

FIG. 3 illustrates example system 100 of FIG. 1 and FIG. 2 with additional details relating to identifying a group by sound data, arranged in accordance with at least some embodiments described herein. FIG. 3 is substantially similar to FIG. 1 and FIG. 2, with additional details. Those components in FIG. 3 that are labeled identically to components of FIG. 1 and FIG. 2 will not be described again for the purposes of clarity.

As discussed above, processor 106 may not determine a specific name for each identified individual within group 122 due to insufficient sound data 114. For example, processor 106 may not be able to associate social network members with a corresponding identification number. But, processor 106 may be able to identify social network members in group 122 (e.g. Sally, Riley, Tom and Mike are in group 122 but we don't know the respective identification numbers). Processor 106 may send query 230 to social network database 170 to compare set of filtered identified names 160 of group 122 to social network database 170. In response to query 230 from processor 106, filtered identified names 160 may be compared to social network database 170. Processor 106 may receive response 232 to query 230 that may include identifications of social network members 210, 216, 214, and 212 identified as names 202, 204, 206, and 208. Processor 106 may then determine social network members 210, 212, 214, and 216 are in group 122. However, processor 106 may not be able to associate each social network member 210, 212, 214, 216 to an identification number 133, 134, 136, 139 in group 122. Processor 106 may identify advertising content based on group 122 and may send advertising content to a device associated with any social network members 210, 216, 214, and 212 in group 122.

Among other potential benefits, a system in accordance with the disclosure may identify individuals and groups for specific and individualized advertising. Another potential benefit of the disclosed system is identification through sound data may be less expensive compared to video identification methods. Microphones may be less expensive than cameras and each microphone may cover a larger area than a camera. An individual does not need to be looking at a microphone to produce sound data that may be usable.

Figure 4:
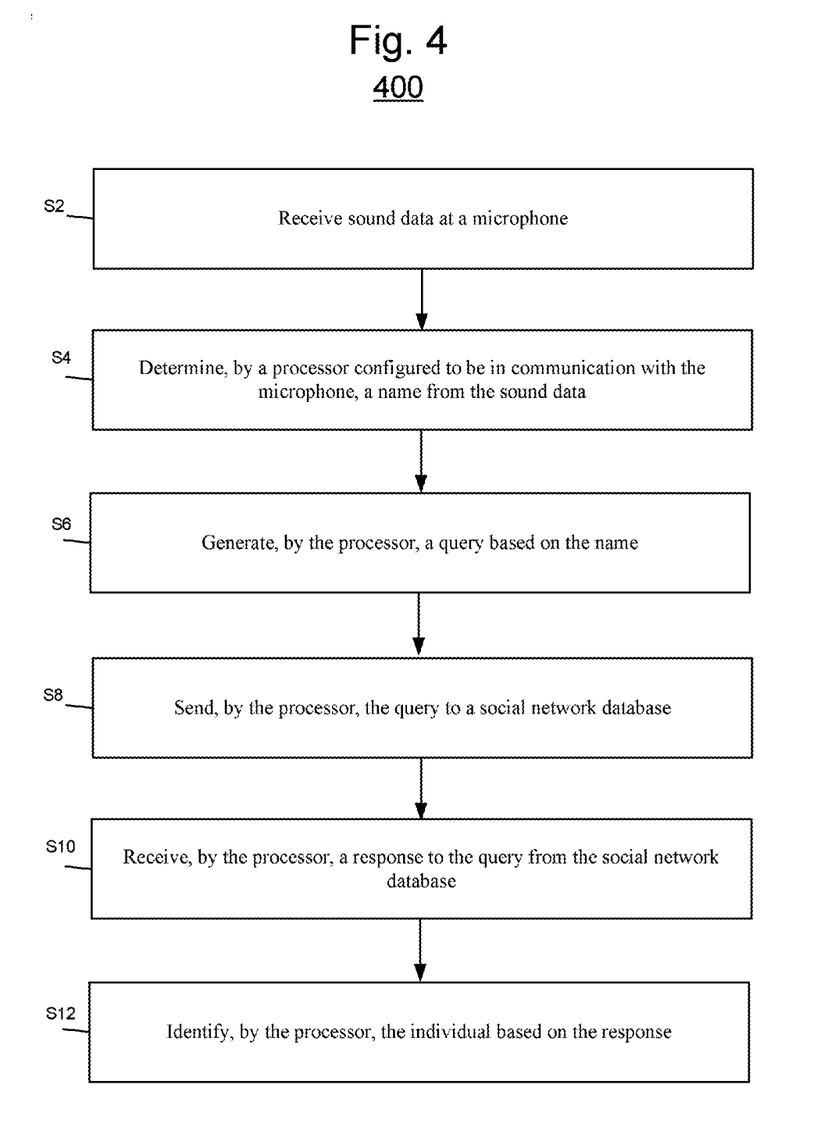
FIG. 4 depicts a flow diagram for example processes for implementing identification by sound data.

FIG. 4 depicts a flow diagram, for example, processes 400 for implementing identification by sound data, arranged in accordance with at least some embodiments described herein. The process in FIG. 4 could be implemented using, for example, system 100 discussed above. An example method for implementing identification by sound data may include one or more operations, actions, or functions as illustrated by one or more of blocks S2, S4, S6, S8, S10 and/or S12. Although illustrated as discrete blocks, various blocks may be divided into additional blocks, combined into fewer blocks, or eliminated, depending on the desired implementation. Processing may begin at block S2, "Receive sound data at a microphone." A microphone may receive sound data. The microphone may be a microphone in a mobile device such as a cell phone, or tablet device. The microphone may include multiple microphone units arranged in an array. The sound data received may relate to sound perceptible to humans of the frequencies from about 20 Hz to about 20,000 Hz. The sound may be produced by voice data, such as individuals speaking, within a zone which may be a sound range of the microphone.

Processing may continue from block S2 to block S4, "Determine, by a processor configured to be in communication with the microphone, a name from the sound data." At block S4, the processor may determine a name from the sound data. The processor may be configured to be in communication with the microphone. The processor may receive the sound data from the microphone over a network. The processor may execute diarization instructions on the sound data and may analyze the sound data to determine voice data. The processor may identify individuals by the determined voice data. The processor may assign an identification number to the voice data. The processor may execute speech recognition instructions on the sound data to identify a name or names within the sound data. The speech recognition instructions may convert the sound data into text, separate the text into words, and separate a name or names from the words.

The processor may filter the names. The filtering may be accomplished by comparing names against a list of names. The processor may also further analyze the sound data and the name or names to determine names associated with individuals. For example, the speech recognition instructions may include natural language processing algorithms which may use grammar to extract meaning from words in the sound data.

Processing may continue from block S4 to block S6, "Generate, by the processor, a query based on the name" At block S6, the processor may generate a query based on the name or names determined. The query may include the name and other names detected in the sound data. The processor may also base the query on a location.

Processing may continue from block S6 to block S8, "Send, by the processor, the query to a social network database." At block S8, the processor may send a query to a social network database. The social network database may be a database related to any social or professional network such as FACEBOOK, LINKED-IN, etc.

Processing may continue from block S8 to block S10, "Receive, by the processor, a response to the query from the social network database." The processor may receive a response from the social network database. The response may include social network members identified as the name or names.

Processing may continue from block S10 to block S12, "Identify, by the processor, the individual based on the response." The processor, in response to receiving the response from the social network database, may identify the individual. The identification may include a first and last name. The processor may send advertising content to a device associated with the social network member.

Figure 5:
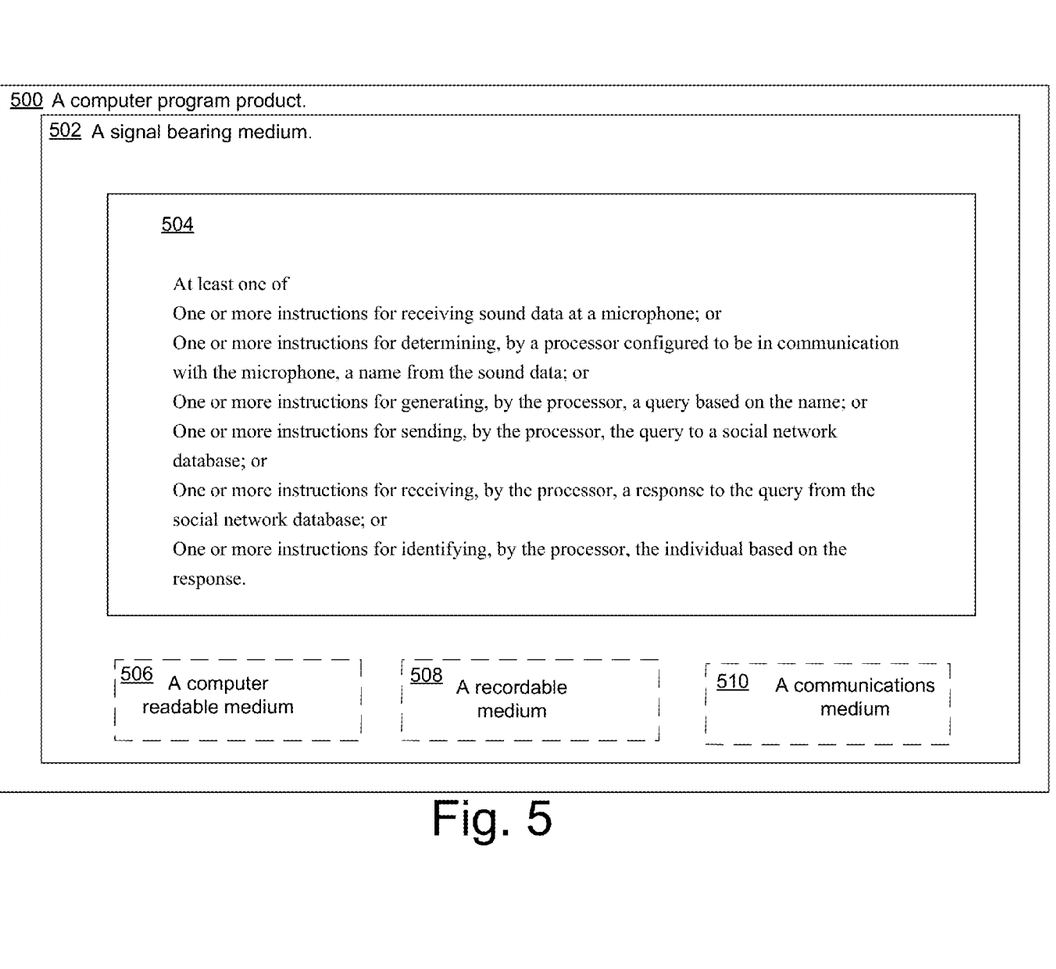
FIG. 5 illustrates computer program products effective to implement identification by sound data.

FIG. 5 illustrates computer program products 500 effective to implement identification by sound data, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4.

In some implementations, signal bearing medium 502 may encompass a computer-readable medium 506, such as, but not limited to, a hard disk drive (HDD), a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
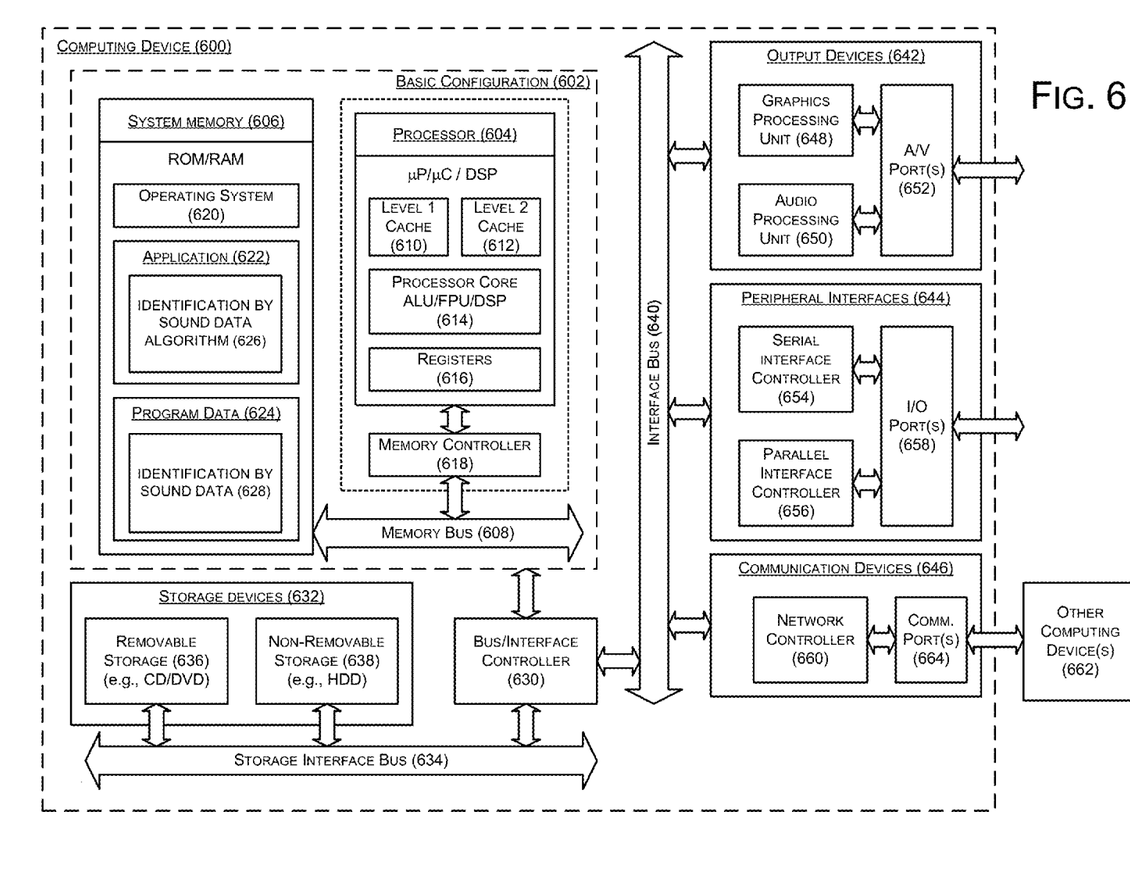
FIG. 6 is a block diagram illustrating an example computing device that is arranged to implement identification by sound data, all arranged in accordance with at least some embodiments described herein.

FIG. 6 is a block diagram illustrating an example computing device 600 that is arranged to implement identification by sound data, arranged in accordance with at least some embodiments presented herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include identification by sound data algorithm 626 that is arranged to perform the functions as described herein including those described previously with respect to FIGS. 1-5. Program data 624 may include identification by sound data 628 that may be useful for identification by sound data as is described herein. In some embodiments, application 622 may be arranged to operate with program data 624 on operating system 620 such that identification by sound data may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact discs (CDs) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to identify individuals, the method comprising:
   receiving, by a processor configured to be in communication with a microphone, sound data from the microphone, wherein the sound data corresponds to a first voice from a first individual and a second voice from a second individual;
   performing, by the processor, speaker diarization on the sound data to determine first voice data related to the first voice and second voice data related to the second voice;
   assigning, by the processor, a first identification number to the first voice data;
   assigning, by the processor, a second identification number to the second voice data;
   determining, by the processor from the sound data, a first name of each of the first individual and the second individual;
   generating, by the processor, a query based on the first name of each of the first individual and the second individual;
   sending, by the processor, the query to a social network database;
   receiving, by the processor, a response to the query from the social network database;
   identifying, by the processor based on the response from the social network database, that the first individual corresponds to one of the first identification number and the second identification number; and
   identifying, by the processor based on the response from the social network database, that the second individual corresponds to an other of the first identification number and the second identification number.

2. The method of claim 1, wherein receiving the sound data includes receiving the sound data from at least one mobile device.

3. The method of claim 1, wherein determining the first name of each of the first individual and the second individual includes performing speech recognition on the sound data.

4. The method of claim 1, wherein:
   receiving the sound data from the microphone includes receiving the sound data from a microphone that is located at a location, and
   generating the query includes generating the query based on the location.

5. The method of claim 1, further comprising:
   identifying advertisement content based on the first individual and the second individual; and
   sending the advertisement content to a respective device associated with each of the first individual and the second individual.

6. The method of claim 1, further comprising filtering the first name of each of the first individual and the second individual against a list of names prior to the generation of the query.

7. A method to identify a social group that includes at least a first individual and a second individual, the method comprising, by a processor:
   receiving first sound data from a first microphone that is located at a first location, wherein the first sound data relates to a first voice and a second voice;
   identifying first voice data in the first sound data;
   identifying second voice data in the first sound data;
   receiving second sound data from a second microphone that is located at a second location, wherein the second sound data relates to the first voice and the second voice;
   identifying third voice data in the second sound data;
   identifying fourth voice data in the second sound data;
   grouping the first voice data, the second voice data, the third voice data, and the fourth voice data into a voice group;
   determining a first name from the first sound data;
   determining a second name from the second sound data;
   generating a query based on the first name and the second name;
   sending the query to a social network database;
   receiving a response to the query from the social network database;
   identifying, based on the response from the social network database, that the first individual is in the social group; and
   identifying, based on the response from the social network database, that the second individual is in the social group.

8. The method of claim 7, wherein:
   identifying the first voice data and the second voice data in the first sound data includes performing speaker diarization on the first sound data to identify the first voice data, which is associated with the first individual and to identify the second voice data, which is associated with the second individual,
   identifying the third voice data and the fourth voice data in the second sound data includes performing speaker diarization on the second sound data to identify the third voice data which is associated with the first individual and to identify the fourth voice data, which is associated with the second individual, and
   the method further comprises:
   assigning a first identification number to the first voice data and the third voice data associated with the first individual;
   assigning a second identification number to the second voice data and the fourth voice data associated with the second individual; and
   storing the first identification number, the second identification number, the first voice data, the second voice data, the third voice data, and the fourth voice data in a memory.

9. The method of claim 7, further comprising, by the processor:
   identifying advertisement content based on the social group; and
   sending the advertisement content to a respective device associated with each of one or more individuals identified in the social group.

10. A system configured to identify individuals, the system comprising:

a microphone configured to generate sound data; and
a processor configured to be in communication with the microphone and a social network database, wherein the processor is configured to:
receive the sound data from the microphone, wherein the sound data corresponds to a first voice from a first individual and a second voice from a second individual;
perform speaker diarization on the sound data to determine first voice data related to the first voice and second voice data related to the second voice;
assign a first identification number to the first voice data;
assign a second identification number to the second voice data;
determine, from the sound data, a first name related to each of the first individual and the second individual;
generate a query based on the first name related to each of the first individual and the second individual;
send the query to the social network database;
receive a response to the query from the social network database;
identify, based on the response from the social network database, that the first individual corresponds to one of the first identification number and the second identification number; and
identify, based on the response from the social network database, that the second individual corresponds to other of the first identification number and the second identification number.

11. The system of claim 10, wherein:
the microphone includes a first microphone,
the system further includes a second microphone and a third microphone, and
the first microphone, the second microphone, and the third microphone are arranged in an array.

12. The system of claim 10, wherein the microphone is included in a mobile device.

13. The system of claim 10, wherein the processor is configured to perform speech recognition on the sound data to determine the first name related to each of the first individual and the second individual.

14. The system of claim 10, wherein:
the microphone is located at a location, and
the query is generated based on the location.

15. The system of claim 10, further comprising a memory configured to be in communication with the processor, wherein the processor is further configured to:
identify advertisement content based on the first individual and the second individual;
access the advertisement content from the memory; and
send the advertisement content to a respective device associated with each of the first individual and the second individual.

16. A system configured to identify a social group that includes at least a first individual and a second individual, the system comprising:
a first microphone at a first location, wherein the first microphone is configured to generate first sound data;
a second microphone at a second location, wherein the second microphone is configured to generate second sound data;
a processor configured to be in communication with the first microphone, the second microphone, and a social network database, wherein the processor is configured to:
receive the first sound data from the first microphone;
identify first voice data in the first sound data;
identify second voice data in the first sound data;
receive the second sound data from the second microphone;
identify third voice data in the second sound data;
identify fourth voice data in the second sound data;
group the first voice data, the second voice data, the third voice data, and the fourth voice data into a voice group;
determine a first name from the first sound data;
determine a second name from the second sound data;
generate a query based on the first name and the second name;
send the query to the social network database;
receive a response to the query from the social network database;
identify, based on the response from the social network database, that the first individual is in the social group; and
identify, based on the response from the social network database, that the second individual is in the social group.

17. The system of claim 16, wherein the processor is configured to perform speaker diarization on the first sound data to determine the first voice data and the second voice data, and on the second sound data to determine the third voice data and the fourth voice data.

18. The system of claim 16, wherein the processor is configured to perform speech recognition on the first sound data and the second sound data to determine the first name and the second name, respectively.

19. The system of claim 16, wherein the processor is configured to:
identify advertisement content based on the social group; and
send the advertisement content to a respective device associated with each of one or more individuals identified in the social group.

* * * * *

UNITED STATES PATENT AND TRADEMARK OFFICE
CERTIFICATE OF CORRECTION

| | |
|---|---|
| PATENT NO. | : 9,786,297 B2 |
| APPLICATION NO. | : 14/420858 |
| DATED | : October 10, 2017 |
| INVENTOR(S) | : Fine |

It is certified that error appears in the above-identified patent and that said Letters Patent is hereby corrected as shown below:

In the Specification

Column 9, Line 20, delete "name" At" and insert -- name." At --, therefor.

In the Claims

Column 14, Line 45, Claim 8, delete "data which" and insert -- data, which --, therefor.

Signed and Sealed this
Seventeenth Day of April, 2018

Andrei Iancu
*Director of the United States Patent and Trademark Office*